United States Patent [19]

Lindquist

[11] 4,258,463

[45] Mar. 31, 1981

[54] TRACK MOUNTING TOOL AND METHOD

[75] Inventor: John F. Lindquist, Morton, Ill.

[73] Assignee: Caterpillar Tractor Co., Peoria, Ill.

[21] Appl. No.: 8,984

[22] Filed: Feb. 5, 1979

[51] Int. Cl.[3] .......................... B23P 19/00; B25B 27/00; B23Q 7/04

[52] U.S. Cl. .......................................... 29/434; 29/270; 29/281.6; 29/283; 29/526 R; 305/60

[58] Field of Search .................. 29/148.3, 434, 526 R, 29/428, 283, 270, 281.6; 305/60, 58; 152/231

[56] References Cited

U.S. PATENT DOCUMENTS

| | | | |
|---|---|---|---|
| 2,823,081 | 2/1958 | Mayo | 305/10 |
| 3,048,917 | 8/1962 | Slaughter | 305/60 X |
| 3,427,079 | 2/1969 | Skromme et al. | 305/58 |
| 3,641,662 | 2/1972 | Garman et al. | 29/428 |
| 3,661,539 | 5/1972 | Eastman | 29/270 |
| 3,711,928 | 1/1973 | Boggs | 305/60 X |
| 3,722,330 | 3/1973 | Smekens | 29/428 X |

FOREIGN PATENT DOCUMENTS

| | | | |
|---|---|---|---|
| 375359 | 6/1932 | United Kingdom | 305/60 |

*Primary Examiner*—Charlie T. Moon
*Attorney, Agent, or Firm*—Phillips, Moore, Weissenberger, Lempio & Majestic

[57] ABSTRACT

A tool (12) for mounting a track assembly (11) on a track-type vehicle comprises first (18) and second (39) attachments for being interconnected between a drive sprocket (10) and the track assembly (11). A flexible connector (35) has its ends attached to the first attachment (18) and is further attached to the second attachment (39). In carrying forth the method, the sprocket (10) is rotated to dispose the free ends of the track assembly (11) adjacent to each other for connection by a master link (16) or pin (42). The tool and method provide for the expeditious and safe mounting of the track assembly (11) on the vehicle, including smaller-sized ones.

20 Claims, 6 Drawing Figures

TRACK MOUNTING TOOL AND METHOD

DESCRIPTION

Technical Field

This invention relates to a tool and method for mounting a track on a track-type vehicle, such as a tractor.

Background Art

The repair of the track of an endless track-type vehicle in the field requires at least partial removal of the track from the vehicle and subsequent remounting thereof on the vehicle, after the repair has been made. U.S. Pat. No. 3,641,662 to James A. Garman, et al. issued on Feb. 15, 1972, and U.S. Pat. No. 3,661,539 to Richard D. Eastman, issued on May 9, 1972, disclose a method and tool for effecting such mounting.

In particular, a first bar member is inserted through aligned pin bores of a pair of laterally-spaced links of the track assembly and a second bar member is engaged by hand with a flange, defined on a drive sprocket of the vehicle. The two bar members are interconnected by a flexible chain. The second bar member is grasped by a workman to hold the chain taut and the sprocket is rotated to wrap a free end of the track, whereat the second bar member is attached, around the sprocket. The free ends of the track are then connected together by inserting a master pin through the link bores formerly occupied by the removed first bar member and aligned bores of the next adjacent links.

This conventional tool and method are not adapted to accommodate the track components of the smaller class of track-type vehicles. In addition, the tool is only designed for use with a track assembly employing a master track pin, such as the type disclosed in U.S. Pat. No. 2,823,081, to R. E. Mayo, issued on Feb. 11, 1958. Furthermore, the above-mentioned second bar member of the tool must be held firmly by the operator upon the wrapping of the track around the sprocket for mounting purposes.

DISCLOSURE OF THE INVENTION

The present invention is directed to overcoming one or more of the problems as set forth above.

In one aspect of this invention, a track mounting tool comprises first and second attachment means for attaching the tool to a sprocket and track assembly of a track-type vehicle and adjustable connection means adapted to have the ends thereof attached to the first attachment means and connectible with the second attachment means.

In another aspect of this invention, the first attachment means includes means for clamping the first attachment means to either side of the sprocket of the vehicle.

In still another aspect of this invention, a method is provided for attaching the tool to the sprocket and track assembly, rotating the sprocket to dispose the ends of the disconnected track assembly adjacent to each other, detaching and removing the tool from the sprocket and track assembly, and securing the ends of the track assembly together.

The track mounting tool and method of this invention provide for the expeditious and safe mounting of an endless track assembly on a track-type vehicle, including smaller sized vehicles. The tool and method are also adapted for use with split-type master links, utilized to connect the ends of the track assembly together, as well as standard master pin and bushing assemblies. Furthermore, once the mounting tool is attached in place between the sprocket and the track of the vehicle, it does not require holding by a workman for subsequent wrapping of the track about the sprocket.

BRIEF DESCRIPTION OF THE DRAWINGS

Other objects of this invention will become apparent from the following description and accompanying drawings wherein.

BEST MODE OF CARRYING OUT THE INVENTION

Figure 1:
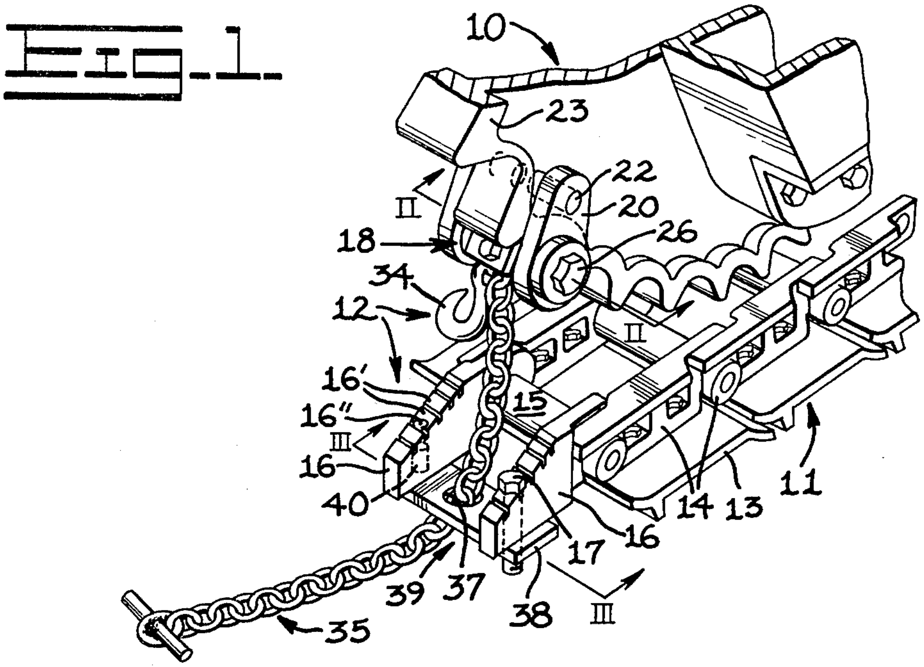
FIG. 1 partially illustrates a sprocket and endless track of the track-type vehicle having a mounting tool embodiment of the present invention attached therebetween.

FIG. 1 illustrates a drive sprocket 10 and a track assembly 11 of a track-type vehicle, such as a tractor or excavator. A mounting tool 12 is also illustrated for aiding a workman in the wrapping of track 11 around sprocket 10 for connecting the free ends of the track assembly together after a repair has been made thereto. Mounting tool 12 may be used on a job site, for example, whereat periodic repair or replacement of components of track assembly 11 may be required. Such components may include a plurality of track shoes 13 which are connected together in a conventional manner by a plurality of links 14 and pin and bushing assemblies 15.

Illustrated track assembly 11 further includes a master track link comprising two pairs of substantially identical parts 16 (one pair shown), a pair of which are suitably connected to each of the two free ends of disconnected track assembly 11 by a pin and bushing assembly 15. Each master link part 16 has a plurality of serrations 16' formed thereon to engage similar serrations formed on a mating part of the master track link, attached to the other free end of track assembly 11. Each master track link part 16 has a vertically disposed bore 16" formed therethrough to receive a bolt 17 for securing the overlying parts together. The master track link may be of the type disclosed in U.S. Pat. No. 3,427,079, issued on Feb. 11, 1969 to A. G. Skromme, et al.

Figure 2:
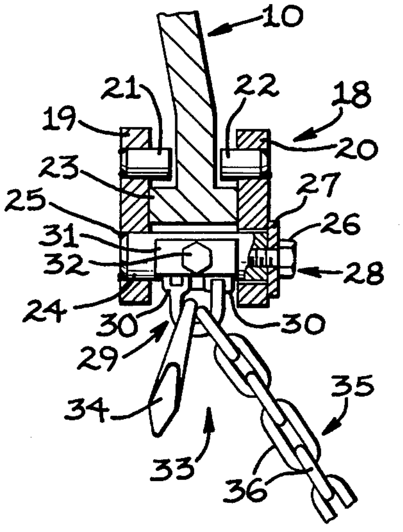
FIG. 2 is a sectional view illustrating attachment of the mounting tool to the sprocket of the vehicle, the view being taken in the direction of arrows II—II in FIG. 1.

Referring to FIGS. 1 and 2, mounting tool 12 comprises a first attachment means 18 for releasably attaching mounting tool in clamped relationship to either side of sprocket 10. As shown in FIG. 2, attachment means 18 comprises a pair of laterally spaced plates 19 and 20 having pins 21 and 22 secured thereon, respectively. In their illustrated clamped relationship on sprocket 10, pins 21 and 22 overlap a peripheral flange 23 of sprocket 10 to prevent dislodgement of attachment means 18 from the sprocket.

As further shown in FIG. 2, a tubular connector 24 has a first end thereof suitably secured, such as by welds 25 or the like, to plate 19, whereas plate 20 is mounted in slip-fit relationship on connector 24. A cap screw 26, threadably mounted to a second end of connector 24, and a washer 27 provide clamping means 28 for clamping plate 20 in place. It can be further seen in FIG. 2 that release of cap screw 26 will permit rightward movement of plate 20 and attached pin 22 to a position permitting removal of attachment means 18 from sprocket 10.

A two-piece link 29 may comprise a pair of identical link parts 30 pivotally connected together by a pin (not shown). Link parts 30 are thus free to pivot relative to each other. Upper link part 30 is clamped to connector 24 by a plate 31 and a cap screw 32 which extends through the plate and link part 30 and is threadably attached to connector 24.

An adjustable connection means 33 comprises a hook 34 mounted on the lower part 30 of link 29 in FIG. 2 and a flexible connector 35. Connector 35 is shown in the form of a chain having a plurality of interconnected links 36, with one of the links being attached to link 29, as shown.

Figure 3:
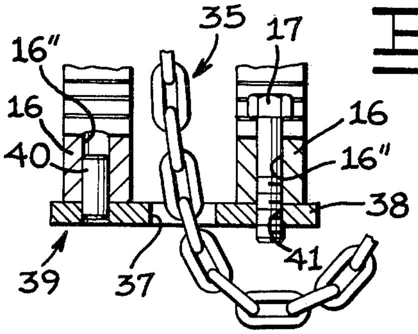
FIG. 3 is a sectional view illustrating attachment of the mounting tool to the track assembly of the vehicle, the view being taken in the direction of the arrows III—III in FIG. 1.

Referring to FIGS. 1 and 3, chain 35 is inserted through an enlarged hole 37, formed through a coupling plate or bar 38 of a second attachment means 39 to provide means for adjusting the effective length of chain 35. Second attachment means 39 further includes a pin 40, secured to one lateral end of plate 38 for insertion into bore 16" of one of the master link parts 15. Bolt 17 is inserted through bore 16" of the other master link part 16 and is threadably attached to plate 38 at a threaded bore 41. Pin 40 essentially functions as a reaction member to prevent plate 38 from pivoting about the axis of bolt 17 when a pulling force is applied to chain 35 in the manner hereinafter described.

Figure 4:
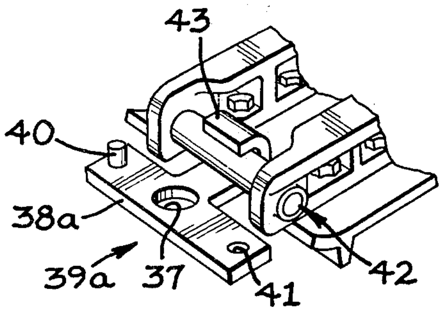
FIG. 4 is an isometric view of a modification of an attachment employed in the mounting tool and showing it attached to a pin and bushing assembly of the track assembly.

FIG. 4 illustrates a modification 39*a* of second attachment means 39 wherein identical numerals depict corresponding constructions, but with numerals depicting modified constructions in FIG. 4 being accompanied by an "a". Modified second attachment means 39*a* is employed for use with track assemblies employing a master track pin 42 in lieu of a master track link. Such a master track pin may be of the type disclosed in U.S. Pat. No. 2,823,081 to R. E. Mayo, issued on Feb. 11, 1958.

Modified second attachment means 39*a* comprises a plate or bar 38*a* which substantially conforms to the construction and arrangement of plate 38 (FIG. 2), including the formation of an enlarged hole 37 therethrough and a pin 40 secured thereon. However, a hook 43 is secured on a trailing edge of plate 38*a* to engage master pin 42 when such master pin is utilized in lieu of a master track link. Attachment means 39*a* is thus adapted for use with an endless track assembly 11 employing either a master track link or master pin 42 therein.

INDUSTRIAL APPLICABILITY

As suggested above, mounting tool 12 of this invention finds particular industrial applicability to the mounting of a track assembly 11 of a track-type vehicle, such as a crawler tractor, over sprocket 10 and idler (not shown) thereof. The tool and hereinafter described method are particularly useful at a job site whereat track 11 must be disconnected and at least partially removed from the vehicle to effect minor repairs thereto, such as the replacement or repair of one or more pin and bushing assemblies 15 of the track assembly.

FIG. 1 illustrates disconnection of track assembly 11 at the master link or master pin thereof to dispose a first free end of the track assembly at least approximately beneath sprocket 10. The workman may then releasably attach first attachment means 18 to sprocket 10 in the manner described above. In particular, release of screw 26 (FIG. 2) will permit a lossening of plate 20 whereby plates 19 and 20, as well as pins 21 and 22 may be placed in straddling relationship on either side of the sprocket. Connector 24 is thus disposed in a root of sprocket 10, defined between a pair of circumferentially adjacent teeth thereof. Screw 26 is then turned down to clamp plates 19 and 20 to opposite sides of flange 23 of sprocket 10 and to position pins 21 and 22 in captured relationship above flange 23.

Figure 5:
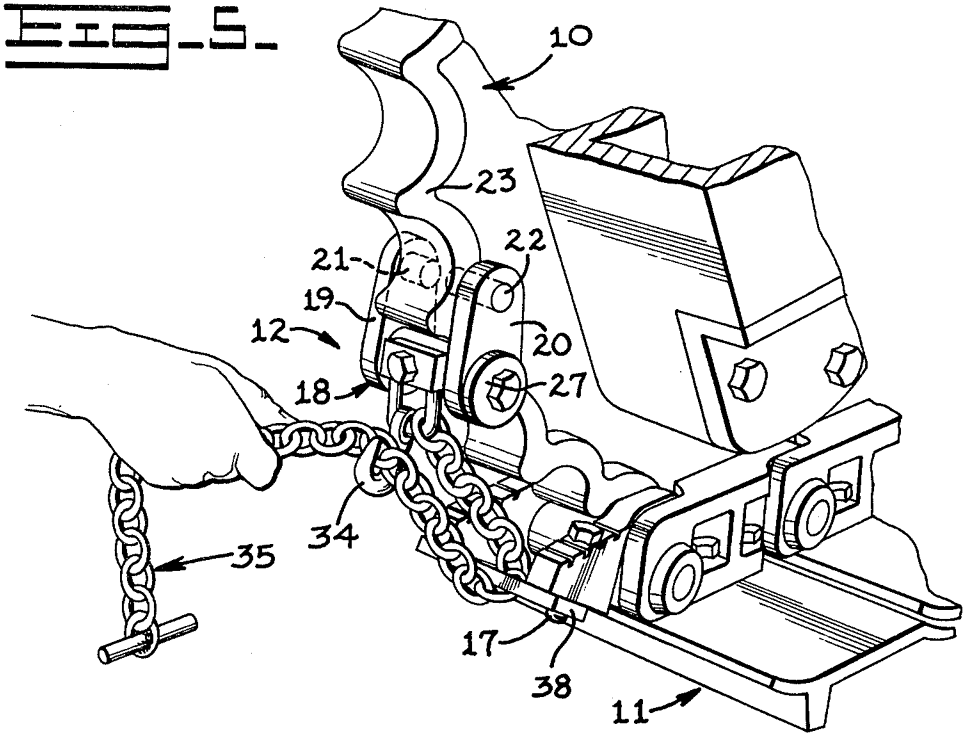
FIG. 5 is a view similar to FIG. 1, but illustrates a sequential step in a method for mounting the track assembly on the vehicle by use of the mounting tool.

The workman may then releasably attach second attachment means 39 to master track link parts 16 by inserting pin 40 in bore 16" of one of the parts and by bolting the other part to coupling bar 38 by means of bolt 17. Chain 35 is then inserted through hole 37, formed through coupling bar 38, and the chain is tightened, as shown in FIG. 5. Upon connection of chain 35 to first attachment means 18 by inserting a link 36 thereof over hook 34, sprocket 10 may be rotated and track 11 wrapped over sprocket 10 in the manner described in above-referenced U.S. Pat. No. 3,641,662. Mounting tool 12 may then be removed from sprocket 10 and from track assembly 11 whereafter the master track link or pin may be reassembled to connect the ends of track assembly 11 together. As discussed above, hook 43 of modified second attachment means 39*a* facilitates the use of the mounting tool with a track assembly employing a master track pin 42 therein rather than a master track link.

Figure 6:
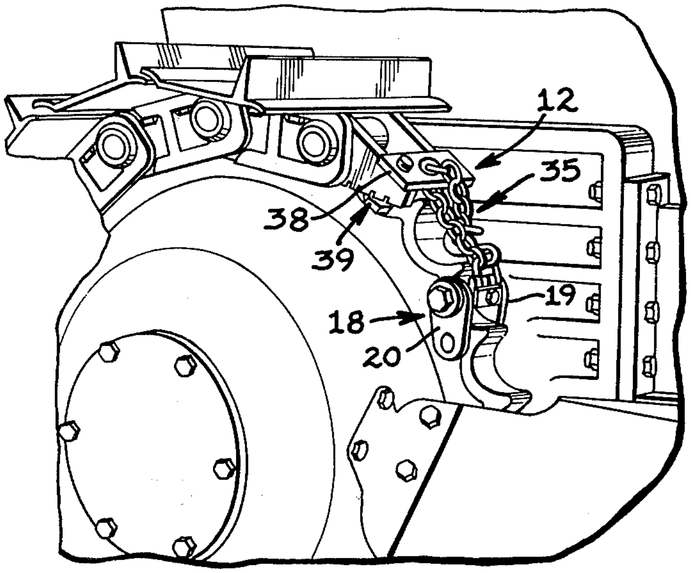
FIG. 6 illustrates a further sequential step for mounting the track assembly on the vehicle by use of the mounting tool.

In view of the above, it can be seen that the mounting tool and method of this invention provide for the expeditious and safe mounting of a track assembly on a vehicle. Such mounting may be effected on smaller-type vehicles and on vehicles which employ either a master track link or master track pin in the endless track assembly. Furthermore, there is no need for the operator to maintain his grasp of the mounting tool during rotation of sprocket 10, upon wrapping of track assembly 11 therearound, as indicated in FIG. 6.

Other aspects, objects, and advantages of this invention can be obtained from a study of the drawings, the disclosure, and the appended claims.

I claim:

1. A track mounting tool comprising
first attachment means (18) for releasable attachment to a sprocket (10) of a track-type vehicle,
second attachment means (39) for releasable attachment to a track assembly (11) of said vehicle,
adjustable connection means (35) for attachment of first and second ends thereof to said first attachment means (18), and
adjustment means (37) for adjustably connecting said adjustable connection means (35) to said second attachment means (39) between the first and second ends of said adjustable connection means (35).

2. The track mounting tool of claim 1 wherein said first attachment means (18) includes clamping means (28) for clamping said first attachment means (18) to said sprocket (10).

3. The track mounting tool of claim 2 wherein said first attachment means (18) further includes a connector (24) and a pair of laterally spaced first (19) and second (20) plates mounted on either end of said connector (24).

4. The track mounting tool of claim 3 wherein said first plate (19) is secured to a first end of said connector (24) and said second plate (20) is slidably mounted on said connector (24).

5. The track mounting tool of claim 4 wherein said first attachment means further includes a pin (21, 22) secured on each of said first (19) and second (20) plates and extending inwardly towards the other pin.

6. The track mounting tool of claim 1 wherein said adjustment means (37) includes a hole (37) formed in said second attachment means (39), said adjustable connection means (35) extending through said hole (37).

7. The track mounting tool of claim 6 wherein said second attachment means (39) includes a coupling bar (38) defining said hole (37) therethrough.

8. The track mounting tool of claim 7 wherein said second attachment means (39) further includes an upstanding pin (40) secured adjacent to one end of said coupling bar (38) and a threaded bore (41) formed in a second, opposite end of said coupling bar (38), said pin (40) and said threaded bore (41) separated by a distance equaling the lateral distance between a pair of links (14) of said track assembly (11).

9. The track mounting tool of claim 1 wherein said second attachment means (39) further includes hook means (43) for engaging a track pin (42) of said track assembly (11).

10. The track mounting tool of claim 1 wherein said adjustable connection means (35) includes a flexible chain (36).

11. The track mounting tool of claim 10 wherein said adjustable connection means (35) further includes hook means (34) for having said chain (36) attached thereto, said hook means (34) secured to said first attachment means (18).

12. In a track mounting tool of the type comprising first attachment means (18) for releasable attachment to a sprocket (10) of a track-type vehicle, second attachment means (39) for releasable attachment to a track assembly (11) of said vehicle, and adjustable connection means (35) for interconnecting said first and second attachment means, the improvement comprising, said first attachment means (18) including means (19–28) for releasably clamping said first attachment means (18) to either side of said sprocket (10).

13. The track mounting tool of claim 12 wherein said last-mentioned means (18) inludes a connector (24) and a pair of laterally spaced first (19) and second (20) plates mounted on either end of said connector (24)

14. The track mounting tool of claim 13 wherein said first plate (19) is secured to a first end of said connector (24) and said second plate (20) is slidably mounted on said connector (24).

15. The track mounting tool of claim 4 wherein said first attachment means further includes a pin (21, 22) secured on each of said first (19) and second (20) plates and extending inwardly towards the other pin.

16. A method for mounting a disconnected track assembly (11) about a sprocket (10) of a track-type vehicle comprising the steps of releasably attaching a first attachment (18) of a mounting tool to said sprocket (10), releasably attaching a second attachment (39) of said mounting tool to a first free end of said track assembly (11) which at least approximately underlies said sprocket (10), connecting a first end of a flexible connector (35) of said tool to said first attachment (18), adjustably connecting said flexible connector (35) to said second attachment (39), connecting a second end of said flexible connector (35) to said first attachment (18), rotating said sprocket (10) to dispose a second end of said track assembly (11) adjacent to the first end thereof, detaching and removing said tool from said sprocket (10) and said track assembly (11), and securing the first and second ends of said track assembly (11) together.

17. The method of claim 16 wherein the step of releasably attaching said second attachment (39) of said mounting tool to said track assembly includes the step of attaching said second attachment (39) to parts (16) of a master link of said track assembly (11).

18. The method of claim 16 wherein the step of releasably attaching said second attachment (39) of said mounting tool to said track assembly includes the step of attaching said second attachment (39) to a master pin (42) of said track assembly (11).

19. In the method of mounting a disconnected track assembly (11) about a sprocket (10) of a track-type vehicle wherein a tool is attached between said track assembly (11) and said sprocket (10), the sprocket (10) is rotated to dispose ends of said track assembly (11) adjacent to each other, and said ends are connected together, the improvement comprising the step of releasably clamping said tool to either side of said sprocket (10).

20. The method of claim 19 wherein said clamping step comprises the step of clamping a pair of plates (19, 20) to either side of said sprocket (10).

* * * * *